United States Patent
Park et al.

(10) Patent No.: US 10,359,880 B2
(45) Date of Patent: Jul. 23, 2019

(54) TOUCH SENSITIVE DISPLAY DEVICE

(71) Applicant: Samsung Display Co., Ltd., Yongin-Si, Gyeonggi-Do (KR)

(72) Inventors: Jin-Hee Park, Seoul (KR); Kwan-Ho Kim, Yongin-si (KR); Ho-Seok Son, Gwangmyeong-si (KR); Sung-Yeon Cho, Hwaseong-si (KR); Jae-Hyung Cho, Suwon-si (KR)

(73) Assignee: Samsung Display Co., Ltd. (KR)

( * ) Notice: Subject to any disclaimer, the term of this patent is extended or adjusted under 35 U.S.C. 154(b) by 183 days.

(21) Appl. No.: 15/479,058

(22) Filed: Apr. 4, 2017

(65) Prior Publication Data
US 2018/0004344 A1   Jan. 4, 2018

(30) Foreign Application Priority Data

Jul. 4, 2016 (KR) .................. 10-2016-0084191

(51) Int. Cl.
*G06F 3/041* (2006.01)

(52) U.S. Cl.
CPC .. *G06F 3/0416* (2013.01); *G06F 2203/04102* (2013.01)

(58) Field of Classification Search
CPC .............. G06F 3/0416; G06F 2203/04102
See application file for complete search history.

(56) References Cited

U.S. PATENT DOCUMENTS

| 2006/0230659 A1* | 10/2006 | Hu ................... G09F 13/22 40/544 |
| 2010/0085320 A1* | 4/2010 | Kuwajima ....... G02F 1/13338 345/173 |
| 2012/0105424 A1 | 5/2012 | Lee et al. |
| 2015/0324162 A1* | 11/2015 | Kim ................. G06F 3/1438 345/169 |
| 2017/0075640 A1* | 3/2017 | Chun ............... G06F 3/1446 |
| 2017/0123459 A1* | 5/2017 | Song ................ G06F 1/1624 |
| 2017/0181295 A1* | 6/2017 | Gu ................... F16M 11/18 |

\* cited by examiner

*Primary Examiner* — Rodney Amadiz
(74) *Attorney, Agent, or Firm* — Innovation Counsel LLP

(57) ABSTRACT

A display device may include a first touch sensing member on a top surface of a display panel, a second touch sensing member on a bottom surface of the display panel, a main FPCB coupled to the display panel and including first and second connecting portions, a first touch FPCB connected to the first touch sensing member and the first connecting portion, a second touch FPCB connected to the second touch sensing member and the second connecting portion, a first touch driving circuit on the first touch FPCB, and a second touch driving circuit on the second touch FPCB. The first touch driving circuit and the first connecting portion may be positioned opposite to each other with respect to the main FPCB. The second touch driving circuit and the second connecting portion may be positioned opposite to each other with respect to the main FPCB.

11 Claims, 14 Drawing Sheets

TOUCH SENSITIVE DISPLAY DEVICE

CROSS-REFERENCE TO RELATED APPLICATION(S)

This application claims priority under 35 USC §119 to Korean Patent Application No. 10-2016-0084191 filed on Jul. 4, 2016 in the Korean Intellectual Property Office (KIPO), the entire disclosure of which is incorporated by reference herein.

BACKGROUND

1. Field

Exemplary embodiments relate generally to display devices. More particularly, exemplary embodiments relate to display devices including touch sensing members.

2. Description of the Related Art

A display device including a display panel (e.g., an organic light emitting display panel, a liquid crystal display panel, an electrowetting display panel, an electrophoretic display panel, a micro-electro-mechanical system display panel, a plasma display panel, etc.) and a touch screen panel (TSP) has found wide acceptance.

When a portion of a display region of the display device is pushed or touched, the touch screen panel may recognize the position of the touch. Because the display panel and the touch screen panel may be independently manufactured and later combined with each other, a driving circuit and a flexible printed circuit board (FPCB) may be required to connect and drive the display panel and the touch screen panel.

SUMMARY

Embodiments of the present invention provide a display device including a more compact flexible printed circuit board (FPCB).

Embodiments of the present invention further provide a display device including a FPCB which connects a plurality of display panels.

A display device according to exemplary embodiments may include a display panel; a first touch sensing member disposed on a top surface of the display panel; a second touch sensing member disposed on a bottom surface of the display panel; a main flexible printed circuit board (FPCB) coupled to the display panel, the main FPCB comprising a first connecting portion and a second connecting portion; a first touch FPCB, a first end of the first touch FPCB being connected to the first touch sensing member, a second end of the first touch FPCB being connected to the first connecting portion; a second touch FPCB, a first end of the second touch FPCB being connected to the second touch sensing member, a second end of the second touch FPCB being connected to the second connecting portion; a first touch driving circuit disposed on the first touch FPCB, the first touch driving circuit being configured to drive the first touch sensing member; and a second touch driving circuit disposed on the second touch FPCB, the second touch driving circuit being configured to drive the second touch sensing member. The first touch driving circuit and the first connecting portion may be positioned opposite to each other with respect to the main FPCB. The second touch driving circuit and the second connecting portion may be positioned opposite to each other with respect to the main FPCB.

In an exemplary embodiment, the first touch driving circuit may overlap the first connecting portion. The second touch driving circuit may overlap the second connecting portion.

In an exemplary embodiment, the main FPCB may include a first surface and a second surface opposite to the first surface. The first connecting portion may be disposed on the first surface and the first touch driving circuit may be disposed to overlap the second surface in plan view.

In an exemplary embodiment, the second connecting portion may be disposed on the first surface and the second touch driving circuit may be disposed to overlap the second surface in plan view.

In an exemplary embodiment, the first surface and the second surface may be a bottom surface and a top surface of the main FPCB, respectively.

In another exemplary embodiment, the second connecting portion may be disposed on the second surface and the second touch driving circuit may be disposed to overlap the first surface in plan view.

In another exemplary embodiment, the first surface and the second surface may be a bottom surface and a top surface of the main FPCB, respectively.

In an exemplary embodiment, the display panel may be a transparent display panel.

In an exemplary embodiment, the display panel may be configured to display images from both the top surface and the bottom surface.

In an exemplary embodiment, the second end of the first touch FPCB and the second end of the second touch FPCB may be respectively compression connected to the first connecting portion and the second connecting portion.

In another exemplary embodiment, the second end of the first touch FPCB and the second end of the second touch FPCB may be respectively connected to the first connecting portion and the second connecting portion by connectors.

In order to achieve the object of the present invention described above, a display device according to some exemplary embodiments may include a first display panel comprising a main board; a second display panel; a first touch sensing member disposed on a top surface of the second display panel; a second touch sensing member disposed on a bottom surface of the second display panel; a main FPCB coupled to the second display panel and the main board, the main FPCB comprising a first connecting portion and a second connecting portion; a first touch FPCB, a first end of the first touch FPCB being connected to the first touch sensing member, a second end of the first touch FPCB being connected to the first connecting portion; a second touch FPCB, a first end of the second touch FPCB being connected to the second touch sensing member, a second end of the second touch FPCB being connected to the second connecting portion; a first touch driving circuit disposed on the first touch FPCB, the first touch driving circuit being configured to drive the first touch sensing member; and a second touch driving circuit disposed on the second touch FPCB, the second touch driving circuit being configured to drive the second touch sensing member.

In an exemplary embodiment, the second end of the first touch FPCB and the second end of the second touch FPCB may be respectively connected to the first connecting portion and the second connecting portion by one or more of a compression connection and a connector.

In an exemplary embodiment, the second display panel may be a transparent display panel.

In an exemplary embodiment, the second display panel may be configured to display images from both the top surface and the bottom surface.

In order to achieve the object of the present invention described above, a display device according to some exemplary embodiments may include a first display panel comprising a main board; a second display panel comprising a first flexible substrate, a second flexible substrate opposite to the first flexible substrate, a display layer disposed between the first flexible substrate and the second flexible substrate, and a touch sensing layer disposed on the second flexible substrate; a touch sensing member disposed on a bottom surface of the second display panel; a main FPCB coupled to the second display panel and the main board, the main FPCB comprising a connecting portion; a touch FPCB, a first end of the touch FPCB being connected to the touch sensing member, a second end of the touch FPCB being connected to the connecting portion; a first touch driving circuit disposed on the main FPCB, the first touch driving circuit being configured to drive the touch sensing layer; and a second touch driving circuit disposed on the touch FPCB, the second touch driving circuit being configured to drive the touch sensing member.

In an exemplary embodiment, the second end of the touch FPCB may be connected to the connecting portion by either a compression connection or a connector.

In an exemplary embodiment, the second display panel may be a transparent display panel.

In an exemplary embodiment, the second display panel may be configured to display images from both the top surface and the bottom surface.

In an exemplary embodiment, the touch sensing layer may be disposed on a top surface of the second flexible substrate.

In the display device according to exemplary embodiments of the present invention, the connecting portion may be disposed on the bottom surface of the main FPCB thereby decreasing an area of a non-display region of the display device. In the display device according to some exemplary embodiments of the present invention, the main FPCB may connect a transparent display panel to an opaque display panel so that the transparent display panel may also function as a cover of the display device.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Hereinafter, display devices in accordance with exemplary embodiments of the present invention will be explained in detail with reference to the accompanying drawings. All numerical values are approximate, and may vary. All examples of specific materials and compositions are to be taken as nonlimiting and exemplary only. Other suitable materials and compositions may be used instead.

Figure 1:
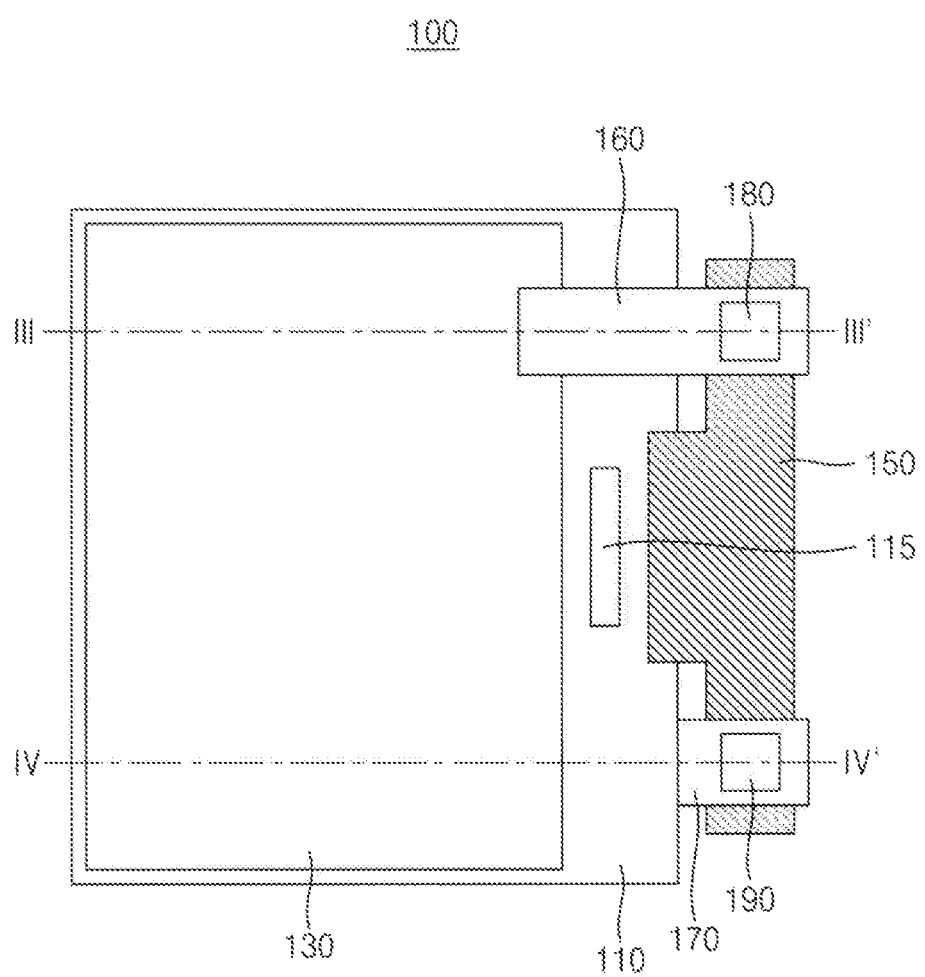
FIG. 1 is a front view illustrating a display device according to exemplary embodiments of the present invention.
Figure 2:
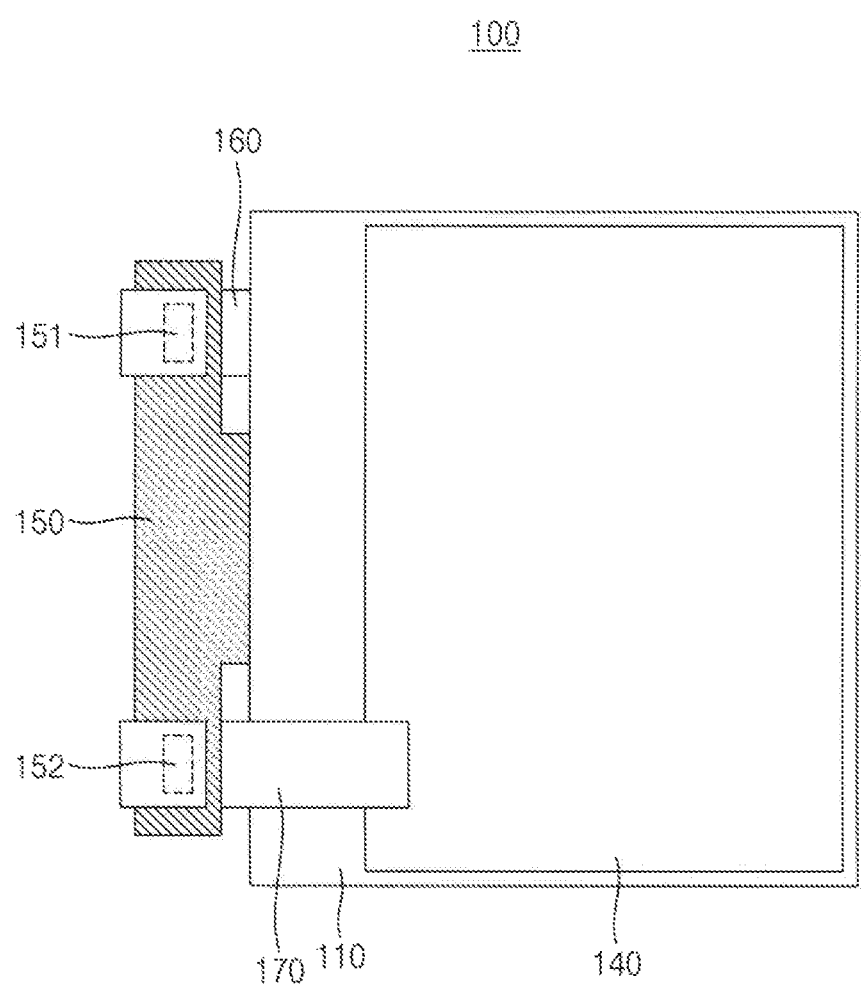
FIG. 2 is a rear view illustrating a display device according to an exemplary embodiment of the present invention.
Figure 3:
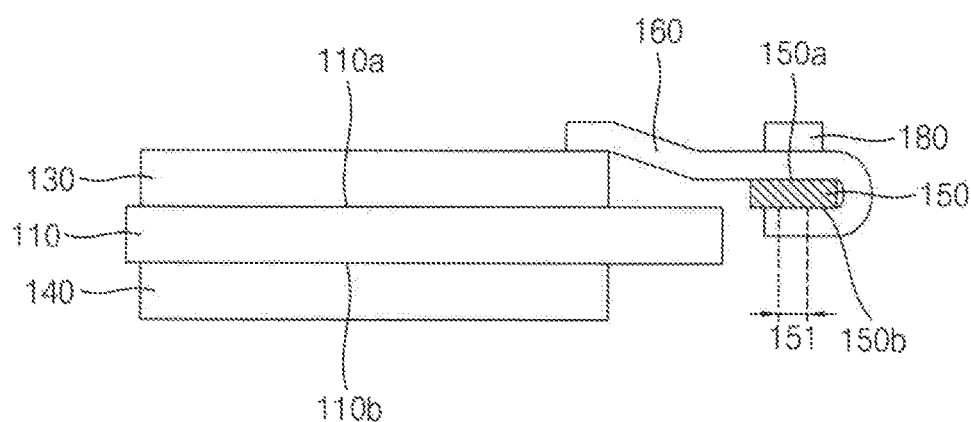
FIG. 3 is a cross-sectional view illustrating an example of the display device cut along a line III-III' in FIG. 1.
Figure 4:
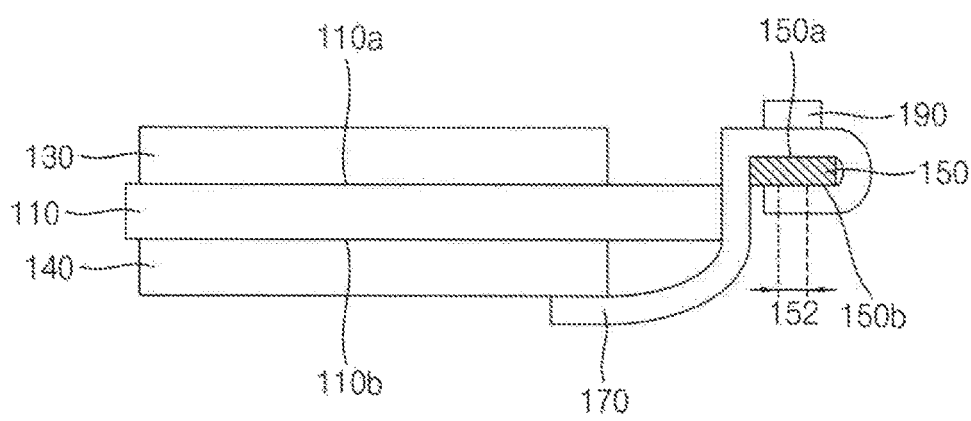
FIG. 4 is a cross-sectional view illustrating an example of the display device cut along a line IV-IV' in FIG. 1.

FIG. 1 is a front view illustrating a display device according to exemplary embodiments of the present invention. FIG. 2 is a rear view illustrating a display device according to an exemplary embodiment of the present invention. FIG. 3 is a cross-sectional view illustrating an example of the display device cut along a line III-III' in FIG. 1. FIG. 4 is a cross-sectional view illustrating an example of the display device cut along a line IV-IV' in FIG. 1.

Referring to FIGS. 1, 2, 3, and 4, a display device 100 may include a display panel 110, a first touch sensing member 130, a second touch sensing member 140, a main flexible printed circuit board (FPCB) 150, a first touch FPCB 160, a second touch FPCB 170, a first touch driving circuit 180, and a second touch driving circuit 190.

The display panel 110 may include a display region on which an image is displayed, and a peripheral region surrounding the display region. The display panel 110 may display an image. To that end, the display panel 110 may include an organic light emitting display panel, a liquid crystal display panel, an electrowetting display panel, an electrophoretic display panel, a MEMS display panel, a plasma display panel, or the like.

In an embodiment, the display panel 110 may be an organic light emitting display panel that includes a base substrate, an opposing substrate facing the base substrate, and an organic light emitting layer formed therebetween. In another embodiment, the display panel 110 may be a liquid crystal display panel that includes a base substrate, an opposing substrate facing the base substrate, and a liquid crystal layer formed therebetween.

In an exemplary embodiment, the display panel 110 may be a transparent display panel. The display panel 110 may transmit external light incident onto the display panel 110. Therefore, a user may observe external objects through the display panel 110.

In an exemplary embodiment, the display panel 110 may display an image at a top surface 110*a* and a bottom surface 110*b*. In an embodiment, the display panel 110 may emit light from both surfaces. In another embodiment, the display panel 110 may be composed of two display panels each emitting light from one surface.

The first touch sensing member 130 may be disposed on the top surface 110*a* of the display panel 110. For example, the first touch sensing member 130 may be disposed corresponding to the display region of the display panel 110.

The second touch sensing member 140 may be disposed on the bottom surface 110*b* of the display panel 110. For example, the second touch sensing member 140 may be disposed corresponding to the display region of the display panel 110.

When a user pushes or touches a portion of the display region, the first touch sensing member 130 and the second touch sensing member 140 may recognize the position of the touch. When a portion of the top surface of the display device 100 is pushed or touched, the first touch sensing member 130 may recognize the position of the touch on the top surface. When a portion of the bottom surface of the display device 100 is pushed or touched, the second touch sensing member 140 may recognize the position of the touch on the bottom surface.

The main FPCB 150 may be connected to the display panel 110. The main FPCB 150 may include a first connecting portion 151 and a second connecting portion 152. For example, the main FPCB 150 may be in contact with the top surface 110*a* of the display panel 110. The first connecting portion 151 and the second connecting portion 152 may be connected to the first touch FPCB 160 and the second touch FPCB 170, respectively.

The main FPCB 150 may receive a driving signal for driving the display panel 110 from an external circuit, and may transmit the driving signal to a display panel driving circuit 115. The display panel driving circuit 115 may generate an image signal based on the driving signal, and may transmit the image signal to pixels included in the display panel 110. Thus, the display panel 110 may display an image.

The first touch FPCB 160 may connect the main FPCB 150 to the first touch sensing member 130. A first end of the first touch FPCB 160 may be connected to the first touch sensing member 130, and second end, opposite to the first end, of the first touch FPCB 160 may be connected to the first connecting portion 151 of the main FPCB 150.

The second touch FPCB 170 may connect the main FPCB 150 to the second touch sensing member 140. A first end of the second touch FPCB 170 may be connected to the second touch sensing member 140, and second end, opposite to the first end, of the second touch FPCB 170 may be connected to the second connecting portion 152 of the main FPCB 150.

The first touch driving circuit 180 may be disposed on the first touch FPCB 160. For example, the first touch driving circuit 180 may be attached to the first touch FPCB 160 by a conductive adhesive member. The first touch driving circuit 180 may drive the first touch sensing member 130.

The second touch driving circuit 190 may be disposed on the second touch FPCB 170. For example, the second touch driving circuit 190 may be attached to the second touch FPCB 170 by a conductive adhesive member. The second touch driving circuit 190 may drive the second touch sensing member 140.

The first touch driving circuit 180 and the first connecting portion 151 may be opposite to each other with respect to the main FPCB 150. Similarly, the second touch driving circuit 190 and the second connecting portion 152 may be opposite to each other with respect to the main FPCB 150.

In an exemplary embodiment, the first touch driving circuit 180 may be disposed on top of the top surface 150*a* of the main FPCB 150, and the first connecting portion 151 may be disposed on the bottom surface 150*b* of the main FPCB 150. Further, the second touch driving circuit 190 may be disposed on top of the top surface 150*a* of the main FPCB 150, and the second connecting portion 152 may be disposed on the bottom surface 150*b* of the main FPCB 150. In other words, the first touch driving circuit 180 and the second touch driving circuit 190 may be disposed over the top surface 150*a* of the main FPCB 150.

As illustrated in FIGS. 1 and 2, the first touch FPCB 160 may be disposed on a first side of the main FPCB 150. As illustrated in FIG. 3, a center portion of the first touch FPCB 160 may be disposed on the top surface 150*a* of the main FPCB 150, and first touch driving circuit 180 may be disposed on the center portion of the first touch FPCB 160. Here, the center portion may be a region which is between opposing ends of the first touch FPCB 160. The first end of the first touch FPCB 160 may be extended from the center portion, and may be connected to the first touch sensing member 130. The second end, opposite to the first end, of the first touch FPCB 160 may be extended from the center portion, and may be connected to the first connecting portion 151. Here, the second end of the first touch FPCB 160 may be bent downward from the center portion, to be connected to the first connecting portion 151.

As illustrated in FIGS. 1 and 2, the second touch FPCB 170 may be disposed on a second side, opposite to the first side, of the main FPCB 150. As illustrated in FIG. 4, a center portion of the second touch FPCB 170 may be disposed on the top surface 150*a* of the main FPCB 150, and second touch driving circuit 190 may be disposed on the center portion of the second touch FPCB 170. Here, the center portion may be a region which is between opposing ends of the second touch FPCB 170. The first end of the second touch FPCB 170 may be extended from the center portion, and may be connected to the second touch sensing member 140. The second end, opposite to the first end, of the second touch FPCB 170 may be extended from the center portion, and may be connected to the second connecting portion 152. Here, the first end of the second touch FPCB 170 may be bent downward from the center portion to be connected to the second sensing member 140, and the second end of the second touch FPCB 170 may be bent downward from the center portion to be connected to the second connecting portion 152.

In a conventional display device, a touch driving circuit and a connecting portion may be disposed on the same surface of a main FPCB. Thus, the conventional main FPCB may have a relatively large width. Accordingly, the dead space of the display device including the conventional main FPCB may be relatively large.

In the display device 100 according an exemplary embodiment of the present invention, the first and second touch driving circuits 180 and 190, and the first and second connecting portions 151 and 152 may be opposite to each other with respect to the main FPCB 150, respectively, so that a width of the main FPCB 150 may decrease. Accordingly, the dead space of the display device 100 including the main FPCB 150 may decrease.

In an exemplary embodiment, the first touch driving circuit 180 may overlap the first connecting portion 151, and the second touch driving circuit 190 may overlap the second connecting portion 152. In this case, a width of the main FPCB 150 may further decrease, so that the dead space of the display device 100 may further decrease.

In an exemplary embodiment, the second end of the first touch FPCB 160 and the second end of the second touch FPCB 170 may be connected to the first connecting portion 151 and the second connecting portion 152, respectively. A compressing process using a bonding device may be used to connect the second end of the first touch FPCB 160 and the second end of the second touch FPCB 170 to the first connecting portion 151 and the second connecting portion 152, respectively. For example, an anisotropic conductive film (ACF) may be interposed between the second end of the first touch FPCB 160 and the first connecting portion 151, and between the second end of the second touch FPCB 170 and the second connecting portion 152. Then, heat and pressure may be applied to compress the first touch FPCB 160 and the second touch FPCB 170 against the first connecting portion 151 and the second connecting portion 152, respectively. In this case, the second end of the first touch FPCB 160 and the second end of the second touch FPCB 170 may be directly connected to the first connecting portion 151 and the second connecting portion 152, respectively.

Figure 5:
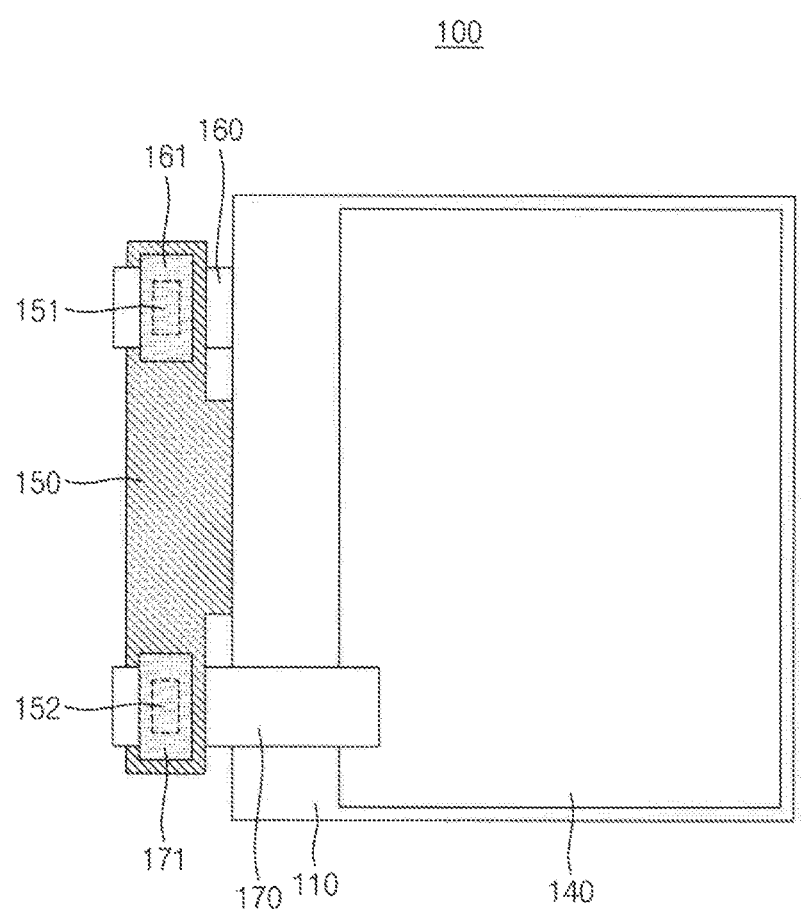
FIG. 5 is a rear view illustrating a display device according to another exemplary embodiment of the present invention.
Figure 6:
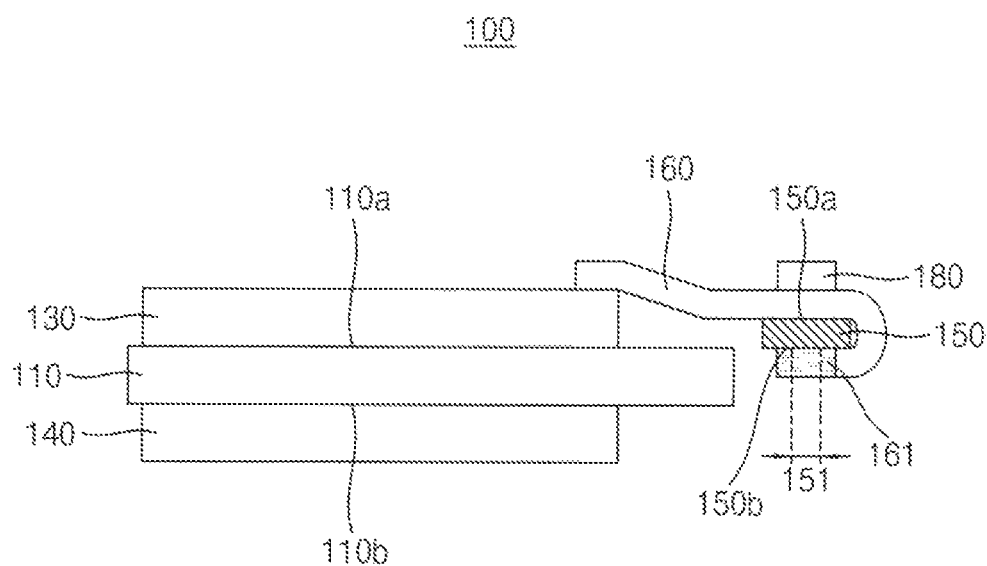
FIG. 6 is a cross-sectional view illustrating another example of the display device cut along a line III-III' in FIG. 1.
Figure 7:
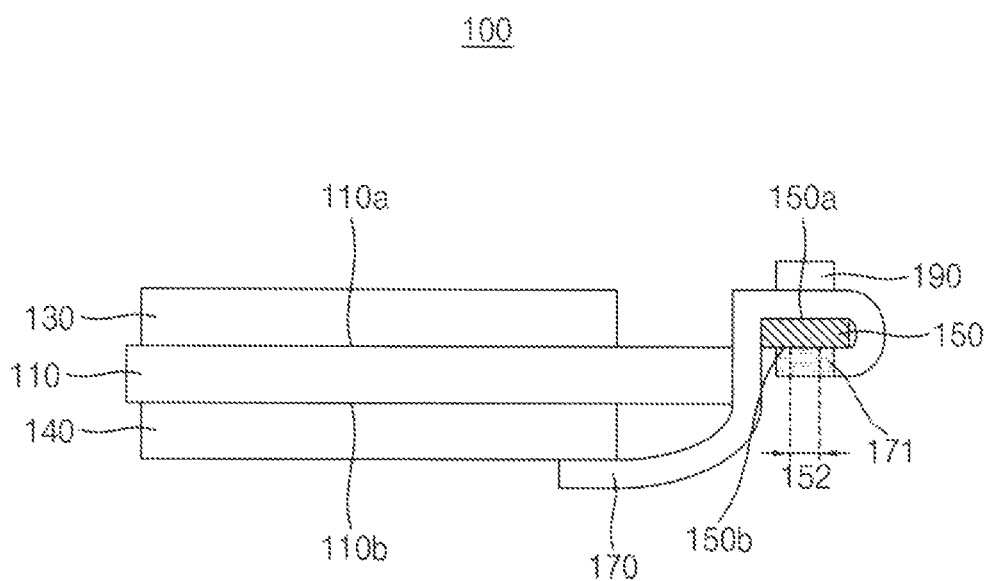
FIG. 7 is a cross-sectional view illustrating another example of the display device cut along a line IV-IV' in FIG. 1.

FIG. 5 is a rear view illustrating a display device according to another exemplary embodiment of the present invention. FIG. 6 is a cross-sectional view illustrating another example of the display device cut along a line in FIG. 1. FIG. 7 is a cross-sectional view illustrating another example of the display device cut along a line IV-IV' in FIG. 1.

Referring to FIGS. 1, 5, 6, and 7, a display device 100 may include a display panel 110, a first touch sensing member 130, a second touch sensing member 140, a main FPCB 150, a first touch FPCB 160, a second touch FPCB 170, a first touch driving circuit 180, and a second touch driving circuit 190.

The display device 100 illustrated in FIGS. 5, 6, and 7 may have elements and/or constructions substantially the same as or similar to the display device 100 illustrated in FIGS. 2, 3, and 4 except for a first connector 161 and a second connector 171. Therefore, a detailed description of repeated elements and/or constructions is omitted, and like reference numerals are used to designate like elements.

In an exemplary embodiment, the second end of the first touch FPCB 160 and the second end of the second touch FPCB 170 may be connected to the first connecting portion 151 and the second connecting portion 152 by using connectors 161 and 171, respectively. Specifically, as illustrated in FIG. 6, a first connector 161 may be disposed at the second end of the first touch FPCB 160, and the first connector 161 may be bound to the first connecting portion 151, so that the second end of the first touch FPCB 160 may be connected to the first connecting portion 151. Further, as illustrated in FIG. 7, a second connector 171 may be disposed at the second end of the second touch FPCB 170, and the second connector 171 may be bound to the second connecting portion 152, so that the second end of the second touch FPCB 170 may be connected to the second connecting portion 152.

Figure 8:
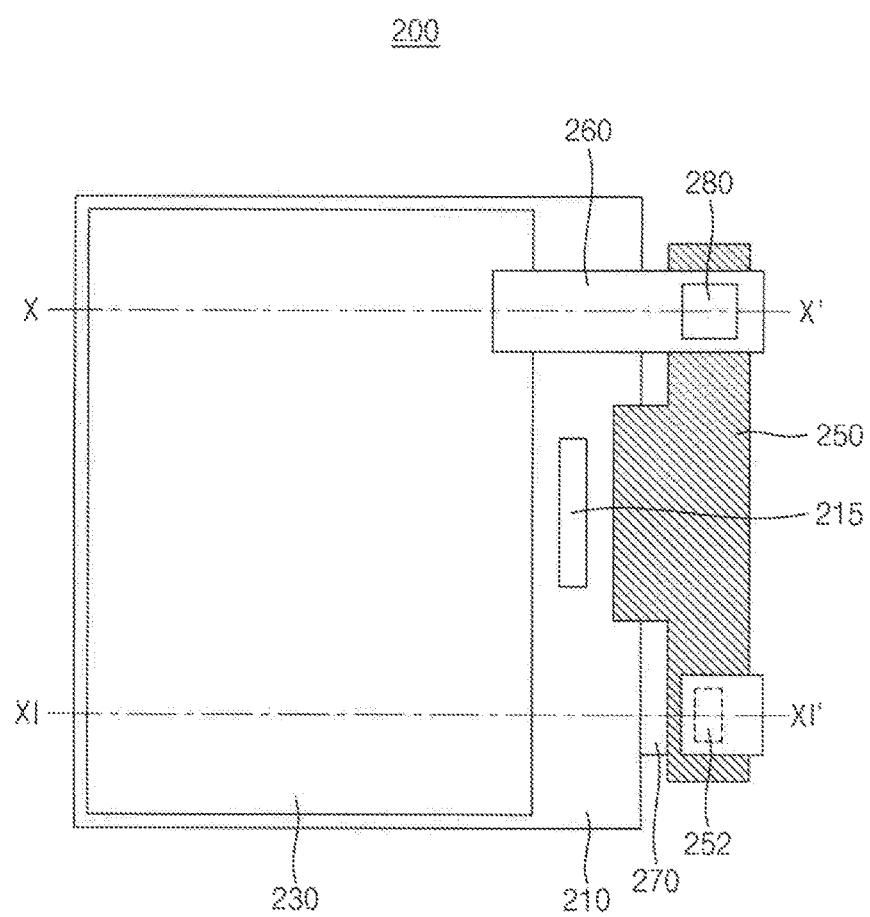
FIG. 8 is a front view illustrating a display device according to some exemplary embodiments of the present invention.
Figure 9:
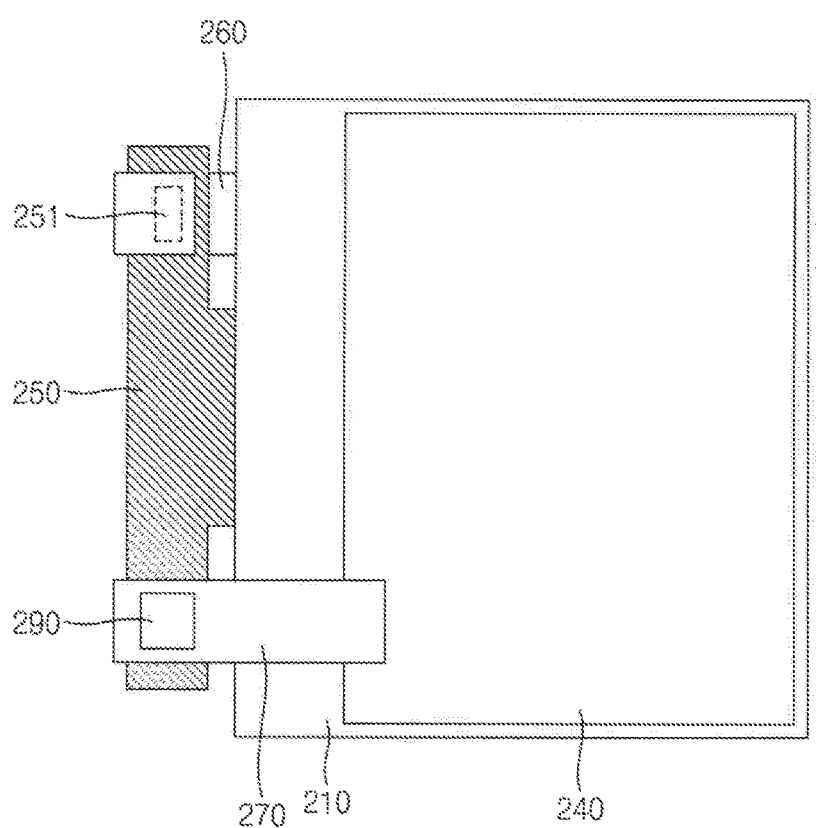
FIG. 9 is a rear view illustrating a display device according to some exemplary embodiments of the present invention.
Figure 10:
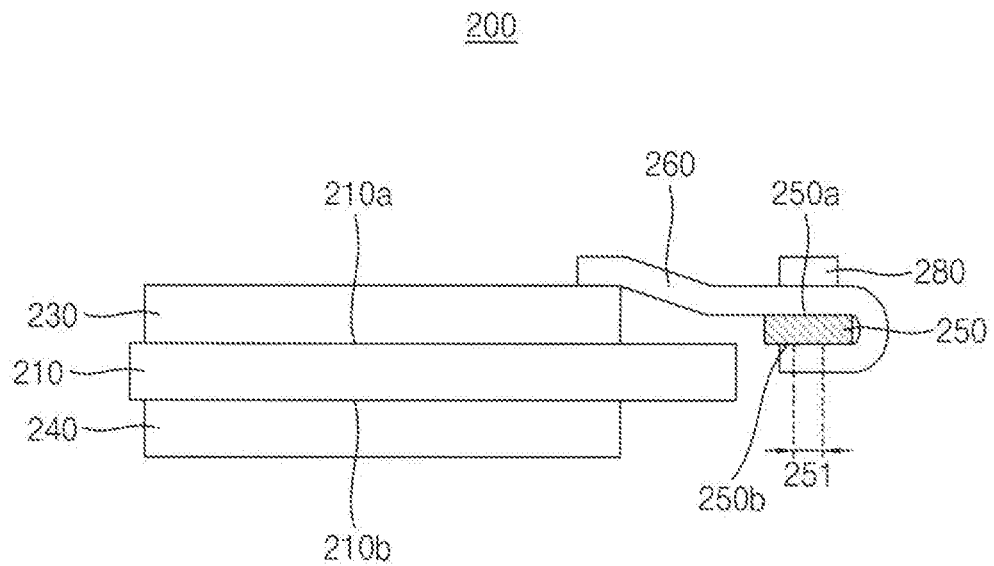
FIG. 10 is a cross-sectional view illustrating the display device cut along a line X-X' in FIG. 8.
Figure 11:
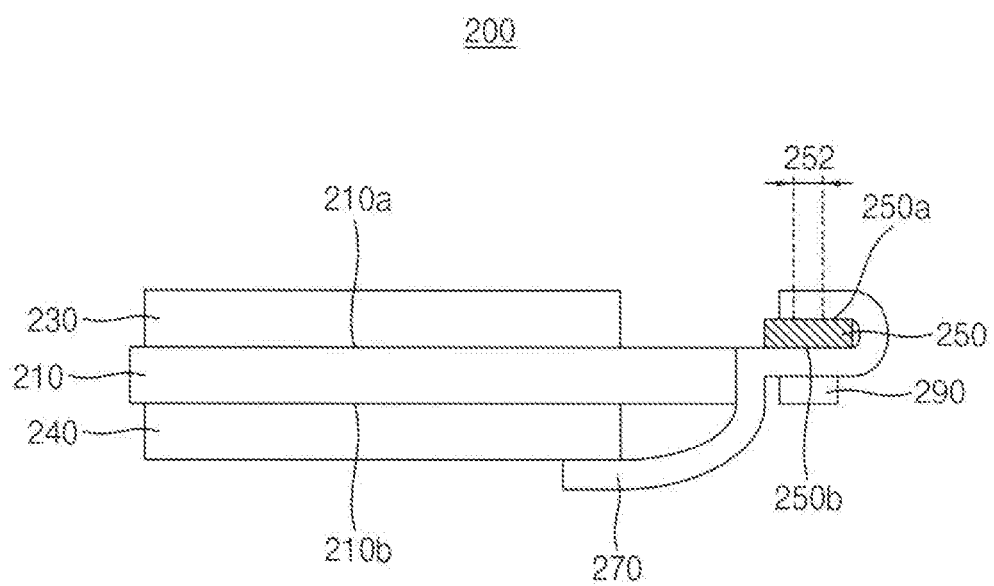
FIG. 11 is a cross-sectional view illustrating the display device cut along a line XI-XI' in FIG. 8.

FIG. 8 is a front view illustrating a display device according to some exemplary embodiments of the present invention. FIG. 9 is a rear view illustrating a display device according to some exemplary embodiments of the present invention. FIG. 10 is a cross-sectional view illustrating the display device cut along a line X-X' in FIG. 8. FIG. 11 is a cross-sectional view illustrating the display device cut along a line XI-XI' in FIG. 8.

Referring to FIGS. 8, 9, 10, and 11, a display device 200 may include a display panel 210, a first touch sensing member 230, a second touch sensing member 240, a main FPCB 250, a first touch FPCB 260, a second touch FPCB 270, a first touch driving circuit 280, and a second touch driving circuit 290.

The display device 200 illustrated in FIGS. 8, 9, 10, and 11 may have elements and/or constructions substantially the same as or similar to the display device 100 illustrated in FIGS. 1, 2, 3, and 4 except for the structures of the second touch FPCB 270, the second touch driving circuit 290, and the second connecting portion 252. Therefore, a detailed description of repeated elements and/or constructions is omitted, and like reference numerals are used to designate like elements.

In an exemplary embodiment, the first touch driving circuit 280 may be disposed on top of the top surface 250a of the main FPCB 250, and the first connecting portion 251 may be disposed on the bottom surface 250b of the main FPCB 250. Further, the second touch driving circuit 290 may be disposed on the bottom surface 250b of the main FPCB 250, and the second connecting portion 252 may be disposed on the top surface 250a of the main FPCB 250. In other words, the first touch driving circuit 280 may be disposed over the top surface 250a of the main FPCB 250, and the second touch driving circuit 290 may be disposed under the bottom surface 250b of the main FPCB 250.

As illustrated in FIGS. 8 and 9, the first touch FPCB 260 may be disposed on a first side of the main FPCB 250. As illustrated in FIG. 10, a center portion of the first touch FPCB 260 may be disposed on the top surface 250a of the main FPCB 250, and first touch driving circuit 280 may be disposed on the center portion of the first touch FPCB 260. Here, the center portion may be a region which is between opposite ends of the first touch FPCB 260. The first end of the first touch FPCB 260 may be extended from the center portion, and may be connected to the first touch sensing member 230. The second end, opposite to the first end, of the first touch FPCB 260 may be extended from the center portion, and may be connected to the first connecting portion 251. Here, the second end of the first touch FPCB 260 may be bent downward from the center portion to be connected to the first connecting portion 251.

As illustrated in FIGS. 8 and 9, the second touch FPCB 270 may be disposed on a second side, opposite to the first side, of the main FPCB 250. As illustrated in FIG. 11, a center portion of the second touch FPCB 270 may be disposed on the bottom surface 250b of the main FPCB 250, and second touch driving circuit 290 may be disposed on the center portion of the second touch FPCB 270. Here, the center portion may be a region which is between ends of the second touch FPCB 270. The first end of the second touch FPCB 270 may be extended from the center portion, and may be connected to the second touch sensing member 240. The second end, opposite to the first end, of the second touch FPCB 270 may be extended from the center portion, and may be connected to the second connecting portion 252. Here, the second end of the second touch FPCB 270 may be bent upward from the center portion to be connected to the second connecting portion 252.

Comparing the display device 200 described with reference to FIGS. 8, 9, 10, and 11 with the display device 100 described with reference to FIGS. 1, 2, 3, and 4, the center portion of the second touch FPCB 170 may be disposed on the top surface 150a of the main FPCB 150 in the display device 100 as illustrated in FIG. 4, but the center portion of the second touch FPCB 270 may be disposed on the bottom surface 250b of the main FPCB 250 in the display device 200 as illustrated in FIG. 11. Therefore, a distance between the center portion and the first end of the second touch FPCB 270 illustrated in FIG. 11 may be less than a distance between the center portion and the first end of the second touch FPCB 170 illustrated in FIG. 4. In this case, a distance between the second touch driving circuit 290 and the second touch sensing member 240 may decrease. Therefore, delay in the driving signal may be reduced, and the second touch sensing member 240 may be more rapidly driven.

Figure 12:
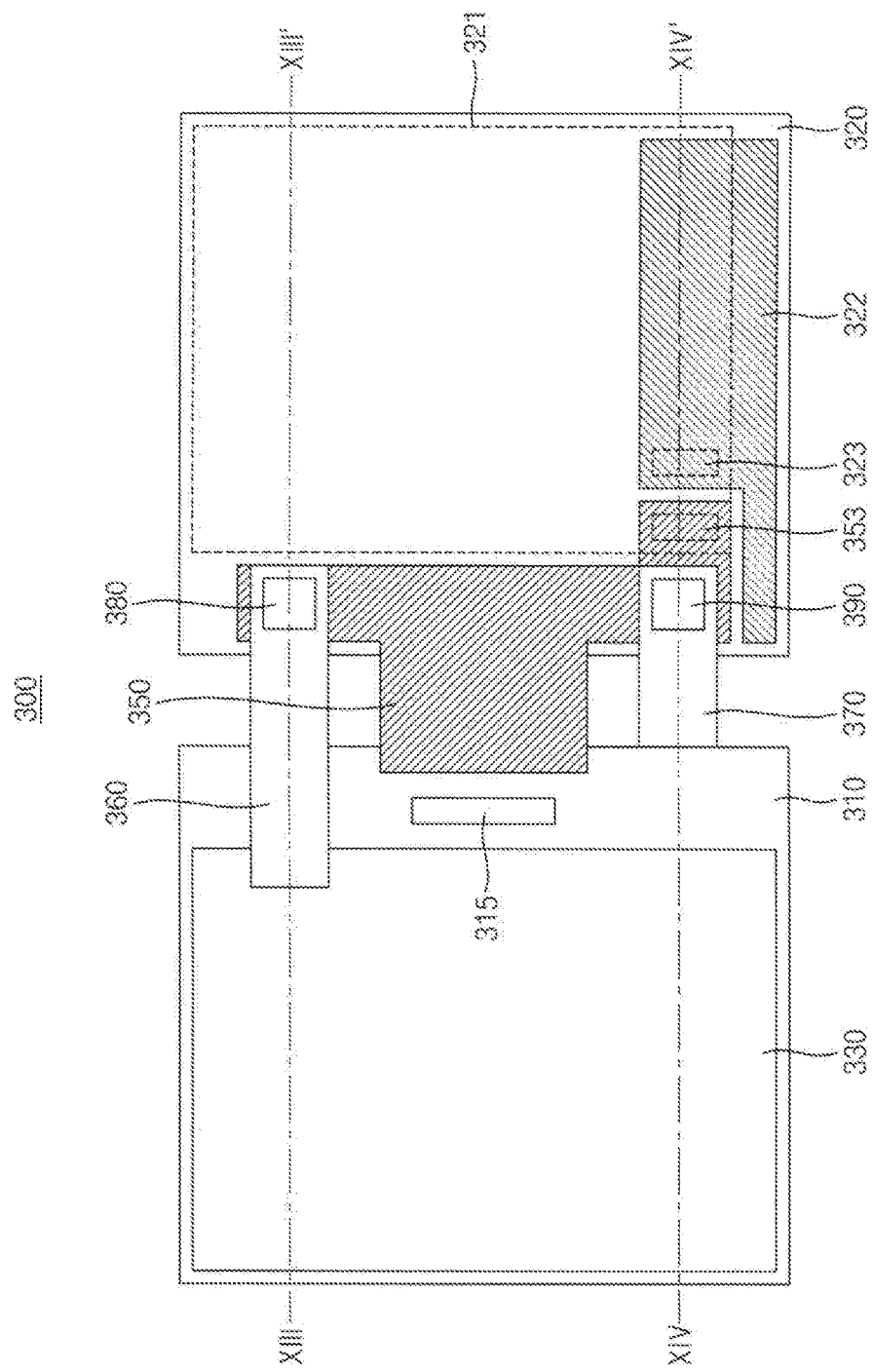
FIG. 12 is a front view illustrating a display device according to some exemplary embodiments of the present invention.
Figure 13:
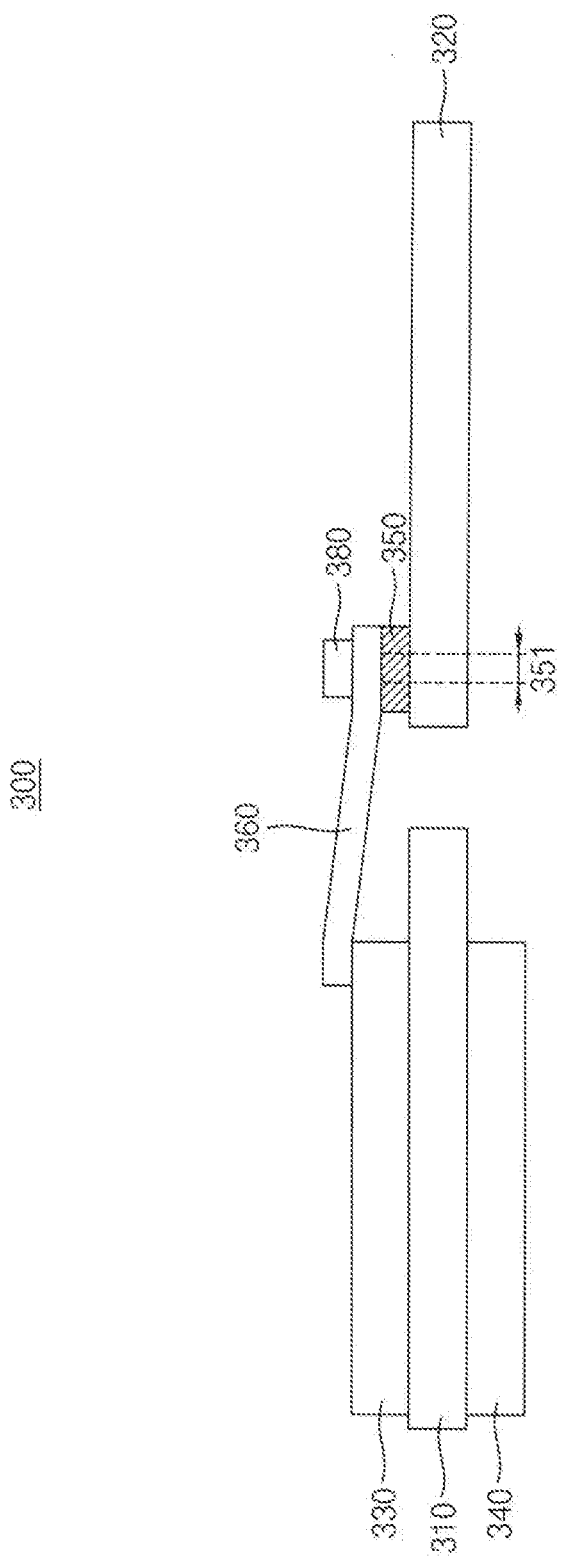
FIG. 13 is a cross-sectional view illustrating the display device cut along a line XIII-XIII' in FIG. 12.
Figure 14:
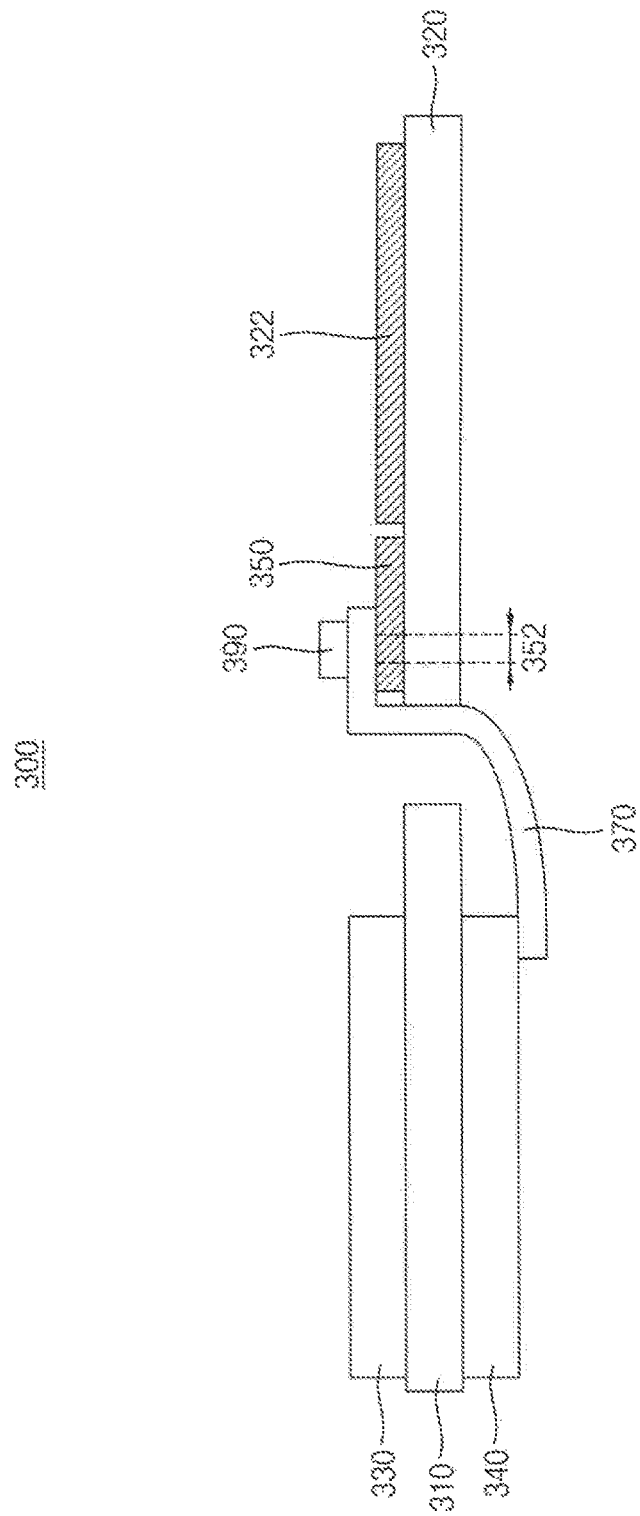
FIG. 14 is a cross-sectional view illustrating the display device cut along a line XIV-XIV' in FIG. 12.

FIG. 12 is a front view illustrating a display device according to some exemplary embodiments of the present invention. FIG. 13 is a cross-sectional view illustrating the display device cut along a line XIII-XIII' in FIG. 12. FIG. 14 is a cross-sectional view illustrating the display device cut along a line XIV-XIV' in FIG. 12.

Referring to FIGS. 12, 13, and 14, a display device 300 may include a first display panel 320, a second display panel 310, a first touch sensing member 330, a second touch sensing member 340, a main FPCB 350, a first touch FPCB 360, a second touch FPCB 370, a first touch driving circuit 380, and a second touch driving circuit 390. The second display panel 310 illustrated in FIG. 12 may correspond to the display panel 110 illustrated in FIG. 1.

The display device 300 illustrated in FIGS. 12, 13, and 14 may have elements and/or constructions substantially the same as or similar to the display device 100 illustrated in FIGS. 1, 2, 3, and 4 except for the structures of the first display panel 320, the first touch FPCB 360, and the second touch FPCB 370. Therefore, a detailed description of repeated elements and/or constructions is omitted, and like reference numerals are used to designate like elements.

Each of the first display panel 320 and the second display panel 310 may include a display region on which an image is displayed, and a peripheral region surrounding the display region. Each of the first display panel 320 and the second display panel 310 may display an image. For example, each of the first display panel 320 and the second display panel 310 may include an organic light emitting display panel, a liquid crystal display panel, an electrowetting display panel, an electrophoretic display panel, an MEMS display panel, a plasma display panel, or the like.

In an exemplary embodiment, the first display panel 320 may be an opaque display panel. That is, the first display panel 320 may block external light incident onto the first display panel 320.

In an exemplary embodiment, the second display panel 310 may be a transparent display panel. The second display panel 310 may transmit external light incident onto the second display panel 310. Therefore, a user may observe external objects through the second display panel 310.

In an exemplary embodiment, the first display panel 320 may display an image at a top surface or a bottom surface. For example, the first display panel 320 may emit light from only one of two surfaces.

In an exemplary embodiment, the second display panel 310 may display an image at a top surface and a bottom surface. In an embodiment, the second display panel 310 may emit light from both surfaces. In another embodiment, the second display panel 310 may be composed of two display panels each emitting light from one surface.

The first display panel 320 may include a main board 321. A processing unit may be disposed in the main board 321. For example, the processing unit may include an application processor (AP) or the like. The processing unit may generate a driving signal for driving the first display panel 320 and the second display panel 310.

A flexible printed circuit board (FPCB) 322 may be connected to the first display panel 320 and the main board 321. For example, the FPCB 322 may be connected to the main board 321 via a connecting portion 323. The FPCB 322 may receive the driving signal for driving the first display panel 320 from the processing unit, and may transmit the driving signal to a first display panel driving circuit (not illustrated). The first display panel driving circuit may generate an image signal based on the driving signal, and may transmit the image signal to pixels included in the first display panel 320. Thus, the first display panel 320 may display an image.

The main FPCB 350 may be connected to the second display panel 310 and the main board 321. For example, the main FPCB 350 may be connected to the main board 321 via a connecting portion 353. The main FPCB 350 may receive the driving signal for driving the second display panel 310 from the processing unit, and may transmit the driving signal to a second display panel driving circuit 315. The second display panel driving circuit 315 may generate an image signal based on the driving signal, and may transmit the image signal to pixels included in the second display panel 310. Thus, the second display panel 310 may display an image.

The main FPCB 350 may serve as a connecting means for connecting the first display panel 320 and the second display panel 310. Therefore, the display device 300 may include a plurality of display panels including the first display panel 320 and the second display panel 310.

The first touch driving circuit 380 may be disposed on the first touch FPCB 360. For example, the first touch driving circuit 380 may be attached to the first touch FPCB 360 by a conductive adhesive member. The first touch driving circuit 380 may drive the first touch sensing member 330.

The second touch driving circuit 390 may be disposed on the second touch FPCB 370. For example, the second touch driving circuit 390 may be attached to the second touch FPCB 370 by a conductive adhesive member. The second touch driving circuit 390 may drive the second touch sensing member 340.

In an exemplary embodiment, the first touch driving circuit 380 may be disposed on top of the top surface of the main FPCB 350, and the first connecting portion 351 may be disposed on the top surface of the main FPCB 350. Further, the second touch driving circuit 390 may be disposed on top of the top surface of the main FPCB 350, and the second connecting portion 352 may be disposed on the top surface of the main FPCB 350. In other words, the first touch driving circuit 380 and the second touch driving circuit 390 may be disposed over the top surface of the main FPCB 350.

In an exemplary embodiment, the second end of the first touch FPCB 360 and the second end of the second touch FPCB 370 may be respectively connected to the first connecting portion 351 and the second connecting portion 352 by compression. In another exemplary embodiment, the second end of the first touch FPCB 360 and the second end of the second touch FPCB 370 may be respectively connected to the first connecting portion 351 and the second connecting portion 352 by using connectors. These connections are described with reference to FIGS. 3, 4, 6, and 7, so that detailed description is omitted here.

Figure 15:
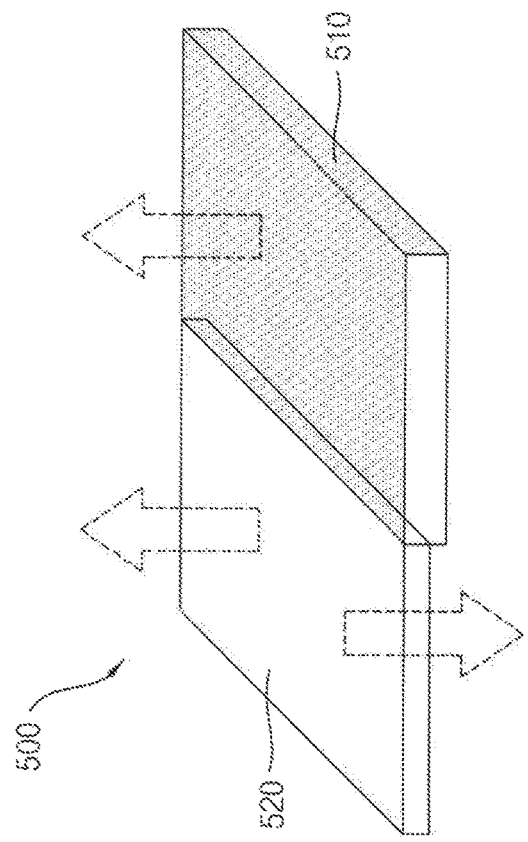
FIG. 15 is a perspective view illustrating a mobile device including a display device shown in FIG. 12.
Figure 15:
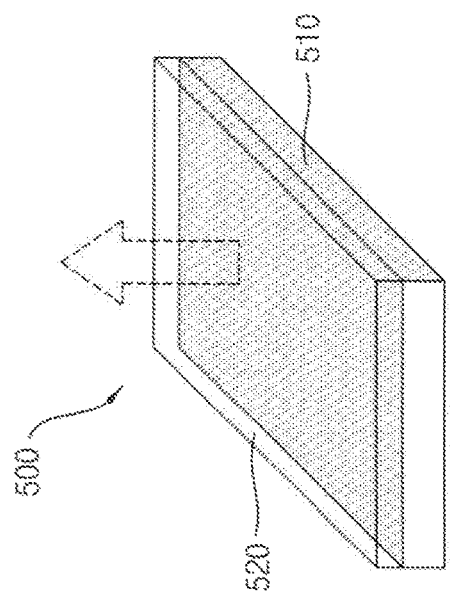

FIG. 15 is a perspective view illustrating a mobile device including a display device shown in FIG. 12.

Referring to FIGS. 12 and 15, a mobile device 500 may include a main display portion 510 and a cover portion 520. The main display portion 510 may be connected to the cover portion 520 via a connecting member (not illustrated). The mobile device 500 may include the display device 300 illustrated in FIGS. 12, 13, and 14.

In an exemplary embodiment, when the display device 300 is applied to the mobile device 500 such as a smartphone, the first display panel 320 may be used as the main display portion 510, and the second display panel 310 may be used as the cover portion 520. The second display panel 310 may be a transparent display panel. In an embodiment, an image displayed from the main display portion 510 may be observed when the cover portion 520 covers the main display portion 510. In another embodiment, the main display portion 510 and the cover portion 520 may display an image simultaneously when the cover portion 520 does not cover the main display portion 510.

Figure 16:
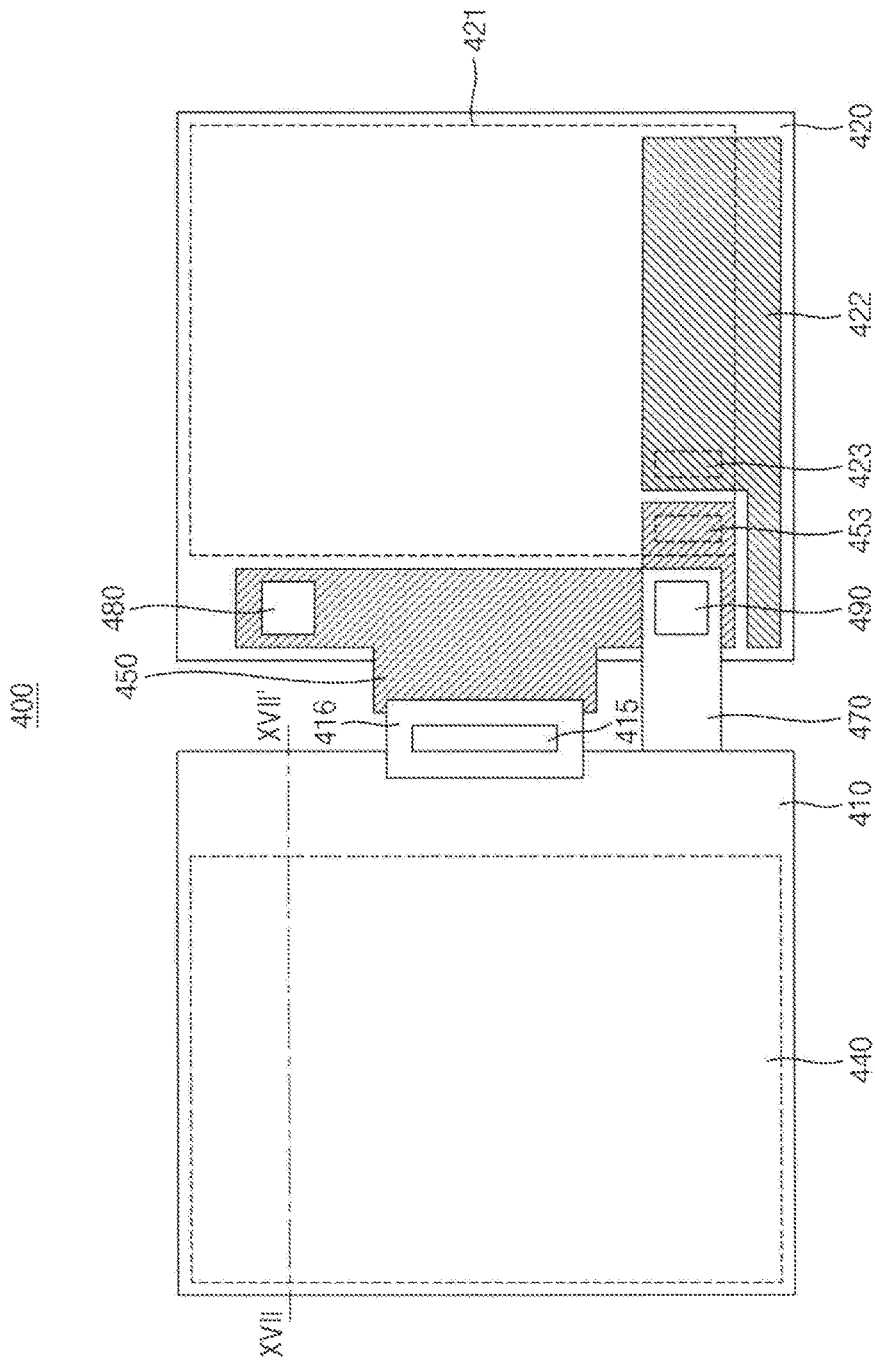
FIG. 16 is a front view illustrating a display device according to some exemplary embodiments of the present invention.
Figure 17:
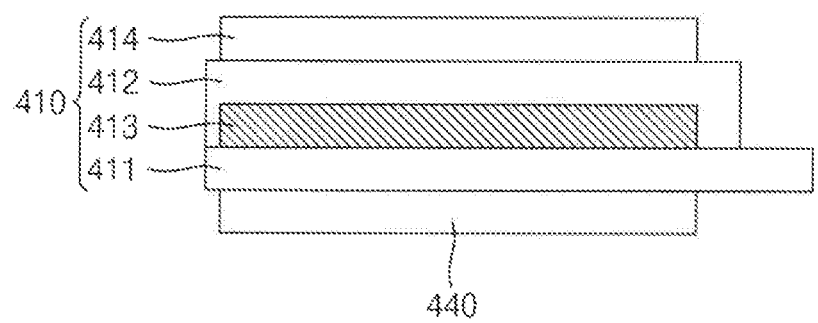
FIG. 17 is a cross-sectional view illustrating the display device cut along a line XVII-XVII' in FIG. 16.

FIG. 16 is a front view illustrating a display device according to some exemplary embodiments of the present invention. FIG. 17 is a cross-sectional view illustrating the display device cut along a line XVII-XVII' in FIG. 16.

Referring to FIGS. 16 and 17, a display device 400 may include a first display panel 420, a second display panel 410, a touch sensing member 440, a main FPCB 450, a touch FPCB 470, a first touch driving circuit 480, and a second touch driving circuit 490. The second display panel 410 may include a first flexible substrate 411, a second flexible substrate 412, a display layer 413, and a touch sensing layer 414.

The display device 400 illustrated in FIGS. 16 and 17 may have elements and/or constructions substantially the same as or similar to the display device 300 illustrated in FIGS. 12, 13, and 14 except for the addition of the touch screen layer 414 instead of the first touch sensing member 330, and the subtraction of the first touch FPCB 360. Therefore, a detailed description of repeated elements and/or constructions is omitted, and like reference numerals are used to designate like elements.

The first flexible substrate 411 may transmit light, and may be flexible. The first flexible substrate 411 may include a polymeric material such as polyimide.

The second flexible substrate 412 may face the first flexible substrate 411. The second flexible substrate 412 may transmit light, and may be a flexible substrate. The second flexible substrate 412 may have a multi-layered structure including at least one inorganic layer and at least one organic layer which are alternately layered.

The display layer 413 may be disposed between the first flexible substrate 411 and the second flexible substrate 412. The display layer 413 may include a transistor and a display element electrically connected to the transistor. For example, the display layer 413 may be an organic light emitting display layer which includes a plurality of transistors and pixel electrodes connected thereto, or a liquid crystal display layer.

The touch sensing layer 414 may be disposed on the second flexible substrate 412. For example, the touch sensing layer 414 may correspond to the display layer 413. In an embodiment, the touch sensing layer 414 may be disposed on a top surface of the second flexible substrate 412 as illustrated in FIG. 17. However, in another embodiment, the touch sensing layer 414 may be disposed on a bottom surface of the second flexible substrate 412. Further, in still another embodiment, some portion of the touch sensing layer 414 may be disposed on the top surface of the second flexible substrate 412, and the other portion of the touch sensing layer 414 may be disposed on the bottom surface of the second flexible substrate 412.

When a user pushes or touches a portion of a display region of the second display panel 410, the touch sensing layer 414 may recognize the corresponding position of the display region. When a portion of the top surface of the second display panel 410 is pushed or touched, the touch sensing layer 414 may recognize the position of that portion of the top surface.

The main FPCB 450 may be connected to the second display panel 410 and the main board 421. For example, the main FPCB 450 may be connected to the second display panel 410 via a flexible printed circuit board (FPCB) 416 including a second display panel driving circuit 415, and the main FPCB 450 may be connected to the main board 421 via the connecting portion 453. The main FPCB 450 may receive the driving signal for driving the second display panel 410 from the processing unit, and may transmit the driving signal to the second display panel driving circuit 415. The second display panel driving circuit 415 may generate an image signal based on the driving signal, and may transmit the image signal to pixels included in the second display panel 410. Thus, the second display panel 410 may display an image.

The first touch driving circuit 480 may be disposed on the main FPCB 450. For example, the first touch driving circuit 480 may be attached to the main FPCB 450 by a conductive adhesive member. The first touch driving circuit 480 may drive the touch sensing layer 414.

The main FPCB 450 may connect the first touch driving circuit 480 to the touch sensing layer 414. Therefore, the display device 400 may not need an additional touch FPCB for connecting the first touch driving circuit 480 to the touch sensing layer 414.

The display device according to exemplary embodiments of the present invention may be applied to a display device included in a computer, a notebook, a mobile phone, a smartphone, a smart pad, a PMP, a PDA, an MP3 player, or the like.

Although the display device according to the exemplary embodiments of the present invention has been described with reference to the drawings, the illustrated embodiment is an example, and may be modified and changed by a person having ordinary knowledge in the relevant technical field without departing from the technical spirit of the present invention described in the following claims. Various features of the above described and other embodiments can be mixed and matched in any manner, to produce further embodiments consistent with the invention.

What is claimed is:

1. A display device, comprising:
   a display panel;
   a first touch sensing member disposed on a top surface of the display panel;
   a second touch sensing member disposed on a bottom surface of the display panel;
   a main flexible printed circuit board (FPCB) coupled to the display panel, the main FPCB comprising a first connecting portion and a second connecting portion;
   a first touch FPCB, a first end of the first touch FPCB being connected to the first touch sensing member, a second end of the first touch FPCB being connected to the first connecting portion;

a second touch FPCB, a first end of the second touch FPCB being connected to the second touch sensing member, a second end of the second touch FPCB being connected to the second connecting portion;

a first touch driving circuit disposed on the first touch FPCB, the first touch driving circuit being configured to drive the first touch sensing member; and a second touch driving circuit disposed on the second touch FPCB, the second touch driving circuit being configured to drive the second touch sensing member;

wherein the first touch driving circuit and the first connecting portion are positioned opposite to each other with respect to the main FPCB, and wherein the second touch driving circuit and the second connecting portion are positioned opposite to each other with respect to the main FPCB.

2. The display device of claim 1, wherein the first touch driving circuit overlaps the first connecting portion, and wherein the second touch driving circuit overlaps the second connecting portion.

3. The display device of claim 1, wherein the main FPCB comprises a first surface and a second surface opposite to the first surface, and wherein the first connecting portion is disposed on the first surface and the first touch driving circuit is disposed to overlap the second surface in plan view.

4. The display device of claim 3, wherein the second connecting portion is disposed on the first surface and the second touch driving circuit is disposed to overlap the second surface in plan view.

5. The display device of claim 4, wherein the first surface and the second surface are a bottom surface and a top surface of the main FPCB, respectively.

6. The display device of claim 3, wherein the second connecting portion is disposed on the second surface and the second touch driving circuit is disposed to overlap the first surface in plan view.

7. The display device of claim 6, wherein the first surface and the second surface are a bottom surface and a top surface of the main FPCB, respectively.

8. The display device of claim 1, wherein the display panel is a transparent display panel.

9. The display device of claim 1, wherein the display panel is configured to display images from both the top surface and the bottom surface.

10. The display device of claim 1, wherein the second end of the first touch FPCB and the second end of the second touch FPCB are respectively compression connected to the first connecting portion and the second connecting portion.

11. The display device of claim 1, wherein the second end of the first touch FPCB and the second end of the second touch FPCB are respectively connected to the first connecting portion and the second connecting portion by connectors.

* * * * *